Sept. 9, 1952 B. FOX Re. 23,547

QUICK DETACHABLE CONNECTOR

Original Filed May 15, 1946 2 SHEETS--SHEET 1

INVENTOR
Benjamin Fox
BY
Harry Lingsam
Attorney

QUICK DETACHABLE CONNECTOR

Original Filed May 15, 1946 2 SHEETS—SHEET 2

INVENTOR
Benjamin Fox
BY
Harry Langsam
Attorney

Reissued Sept. 9, 1952 Re. 23,547

UNITED STATES PATENT OFFICE 23,547

QUICK DETACHABLE CONNECTOR

Benjamin Fox, Philadelphia, Pa.

Original No. 2,502,253, dated March 28, 1950, Serial No. 669,931, May 15, 1946. Application for reissue September 16, 1950, Serial No. 185,311

3 Claims. (Cl. 173—328)

Matter enclosed in heavy brackets [ ] appears in the original patent but forms no part of this reissue specification; matter printed in italics indicates the additions made by reissue.

My invention relates to a device for connecting an electrical circuit, and relates particularly to coupling two portions of an electrical circuit.

Heretofore, electrical coupling members have been employed but each coupling member was complementary to the other, in other words, each portion of the electrical coupling member was made of a different part, whereas, with my invention each of the parts will be identical in construction.

My invention is suitable for electronic circuits where polarity must be maintained, or it may be used in power circuits. In either case good electrical contacts must be maintained between the contact member, and corrosion or dirt on the contact members also must be reduced to a minimum.

It is an object of my invention to manufacture detachable electrical coupling members of identical parts so that they can be mechanically and electrically connected together with a minimum amount of contact resistance.

*Another and a very important object of my invention is to provide, in electrical coupling devices as above set forth, improved contact elements which, while no larger than similar contact elements of the prior art (and in some cases even smaller than corresponding prior art contact elements) will nevertheless provide far greater area of contact and much more positive contact than is provided by corresponding prior art contact elements.*

*Another object of my invention is to provide an improved electrical coupling device having a plurality of identical coupling members which can be readily mated with each other to provide improved electrical connection between the circuit portions to which they are connected.*

Another object of my invention is to provide identical electrical coupling members which are mechanically strong.

Another object of my invention is to provide complementary electrical coupling members which may be made of a single set of dies and punches.

Another object of my invention is to provide complementary casings which may be made of a single set of dies and punches.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing in which.

Figure 1:
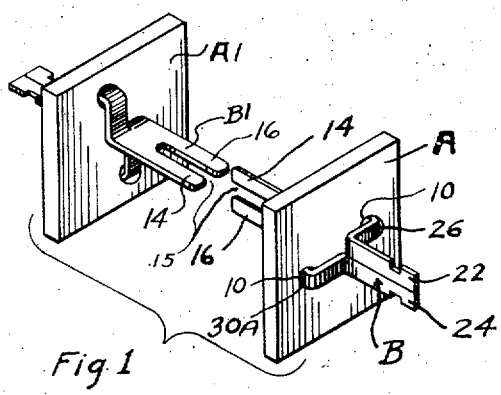
Fig. 1 is a perspective view of a pair of detachable electrical coupling members according to my present invention wherein the electrical coupling members are identical in construction.

Referring now in greater detail to the drawing wherein similar reference characters refer to similar parts, I show an electrical coupling member or connection in Figs. 1 to 4 which comprises an insulating strip or contact supporting insulator, generally designated as A. The insulating strip A has a plurality of openings 10 therethrough in order that a portion of an electrical connector or contact, generally designated as B, may pass through the aforementioned openings.

The electrical connector B comprises a strip of suitable metal, preferably copper or brass having suitable electrical and mechanical characteristics wherein one end has a central longitudinally extending slot 15 therein so that two prongs, branches or legs 14, 16 are formed at that end in the manner of a bifurcation.

Figure 6:
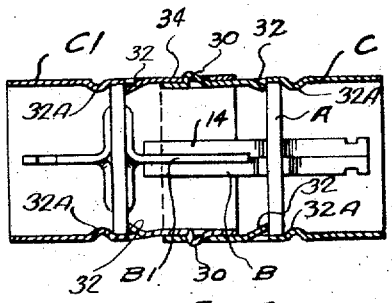
Fig. 6 is a fragmentary view of a pair of quick detachable members within their respective casings or housings according to my present invention.
Figure 3:
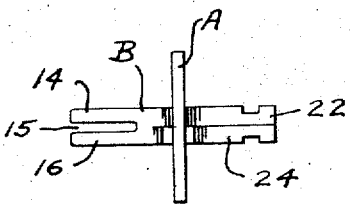
Fig. 3 is a side view of one of the electrical coupling members alone.
Figure 8:
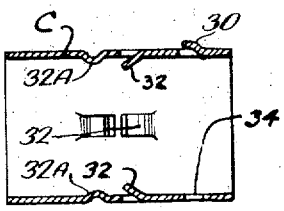
Fig. 8 is a view taken along the line 8—8 of Fig. 7.
Figure 7:
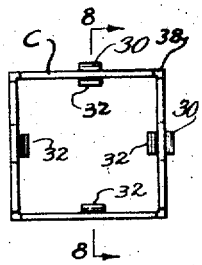
Fig. 7 is an end view of one of the duplicate casings of Fig. 6 by itself.
Figure 4:
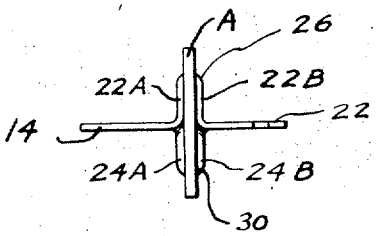
Fig. 4 is a top view of one of the quick detachable coupling members.
Figure 12:
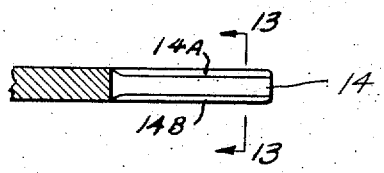
Fig. 12 is a fragmentary view of one of the prongs.
Figure 13:
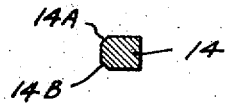
Fig. 13 is a sectional view taken along the line 13—13 of Fig. 12.
Figure 14:
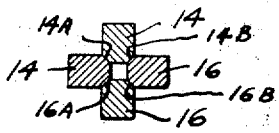
Fig. 14 is a sectional view taken along the line 14—14 of Fig. 2.

The slot 15 must be of a width slightly less than the thickness of the electrical connector B, so that the prongs, *legs, or contacts* 14 and 16 adjacent the slot are spaced apart a distance less than the thickness of the strip B. The slot 15 also extends for a length which is less than the length of the contact for a purpose hereinafter to be further described. The prong 14 has beveled edges *or surfaces* 14A, 14B adjacent the slot 15, and the prong 16 has beveled edges *or surfaces* 16A and 16B adjacent the slot 15 in order that the prongs 14 and 16 of each connector, when fitted together as in Figs. 2, 6 and 14, will make a good electrical contact.

The other end 18 of the contact B has a longitudinal slit 20 therein to provide a pair of longitudinal strips 22 and 24 by means of which the contact B may be securely attached to the insulator A. One terminal or leg 22 is bent at 22A to engage one side of the insulator A and is offset as at 26 to pass through one hole 10, after which the leg 22 is bent back as at 22B to engage the opposite wall of the insulator A and then the leg 22 is bent to be aligned with the leg 14. A notch 28 in the terminal 22 serves to receive wrap-around wire.

The second, integral, longitudinal strip 24 of the contact B is symmetrically located about the longitudinal axis of the strip so that its offset 30A passes through the second opening 10 in the insulating strip A. A portion of the strip 24 then is substantially aligned with the leg 16 on the opposite side of the contact. It is to be observed that the legs 22 and 24 extend in the same vertical plane and portions 22A and 22B engage the insulating strip A, thereby holding the contact in position. The portions 24A and 24B of the portion 24 similarly engage the sides of the insulator to hold the contact member in firm engagement against the strip A. A second identically constructed member has an insulating strip A1 on which is mounted a bifurcated contact member B1 in opposed relation to and in a plane at a right angle to the plane of the contact B. The contacts B and B1 are adapted to interfit in said opposed relation and to engage each other firmly so that an electrical contact will be formed between the members B and B1.

When the bifurcated portions of the contacts B and B1 are fully engaged in opposed relation (see Figs. 2, 6, and 14), the edge surfaces 14A 14B, 16A, and 16B, are in engagement with their complementary surfaces on the other complementary contact member. This provides an increased contact area thereby providing a better electrical contact than is provided where there is a mere line contact. The electrical and mechanical connection is enhanced by the wiping action resulting from the mutual insertion of the two contacts, and by the tension of the contact legs against the included contact members. It is for the purpose of obtaining this constant tension that the slots 15 are made of a width described previously. The length of slot 15 is half the length of the engaging portion of the contact. *When the contacts B and B1 are coupled together, contact of the beveled surfaces 14A, 14B, 16A and 16B is obtained immediately, and since the area of contact is relatively large, it is apparent that the contact resistance is immediately lowered instead of being relatively high, as in the case of mere line or edge contact characteristic of prior art devices. It will be noted that the taper provided by the beveled surfaces 14A, 14B, 16A, and 16B results in opposed or facing surfaces 14C and 16C on each of the prongs or legs 14 and 16 which have a transverse dimension smaller than that of the body portion or overall thickness of each prong.*

I place the insulator A into a casing, generally designated as C, so that the contact B may engage the contact B1 which is on a similar casing, generally designated as C1. However the outside casings C and C1 will interlock one with the other in but one position. Explained in other words, the casings C and C1 will interfit only when the contacts B and B1 interfit mechanically and form[s] an electrical connection. The casing C has a pressed out extension 30 and a plurality of internally stamped out ears 32. The extension 30 is adapted to interfit with a complementary opening 34 in the casing C1. The inturned ears 32 of casing C tend to hold the insulator A in a fixed, immovable position. Spaced from the inturned ears 32 is a complementary inturned ear 32A to hold the insulator in position. In other words one ear 32 abuts one side of the insulator and one ear 32A abuts the other side of the insulator to hold the insulator firmly in position.

The casing C has its corners 38 cut away so that two such identical casings will interfit. To unlock the casings it is necessary to depress ears 30 after which the casings can be separated from each other.

Figures 9, 10, 11:
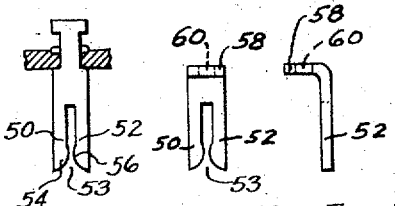
Fig. 9 is a side view of a modification of the contact member according to my present invention, this modification being useful as an insert in a molded insulator.
Fig. 10 is another modification of a contact member in accordance with my present invention.
Fig. 11 is a side view of the contact member of Fig. 10.

In Fig. 9, I have shown a contact member wherein the blade-like contact elements or legs 50 and 52 have an opening 53 therebetween, but the entrance to the opening 53 is partially closed by curved extensions 54 and 56 in the legs 50 and 52 respectively. The extensions 54 and 56 serve to better lock the members together so that the contacts will be more difficult to separate.

In Fig. 10, I have shown another modification of a contact member wherein the wire connecting terminal is bent at right angles, as at 58. An opening 60 through the end 58 is adapted to receive a washer or grommet or wire. In Fig. 11, I have shown a side view of the contact member better illustrated in Fig. 10.

Figure 5:
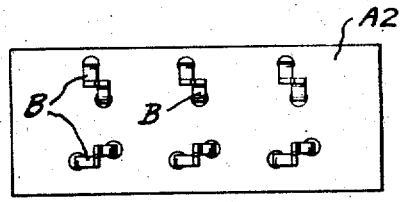
Fig. 5 is a front view of a plurality of electrical connectors according to my present invention mounted on a single panel or plate.
Figure 2:
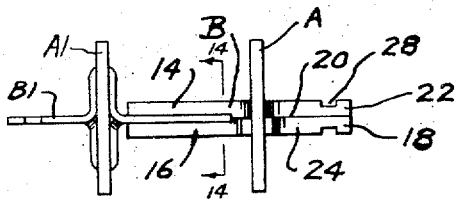
Fig. 2 is a side view of the detachable electrical coupling members joined together.

In Fig. 5, I show a plurality of contact members B mounted on a single insulator strip A2. The contact members B are adapted to mate with a strip of identical construction so that the connections will be polarized. It is to be noted that the upper and lower contacts B are spaced apart and the lower contacts are turned at 90° with respect to the position of the upper contacts. In other words, if the legs 14 and 16 of the upper contacts B lie in a vertical plane, the lower contacts B are positioned so that their contact members 14, 16 lie in a horizontal plane. The reason for this construction is that the electrical contacts of a pair of mutually cooperable strips can only be fitted together in a single predetermined position, namely, when the two contact members are disposed in planes 90° apart, as shown in Figs. 1, 2, 6 and 14.

Figure 15:
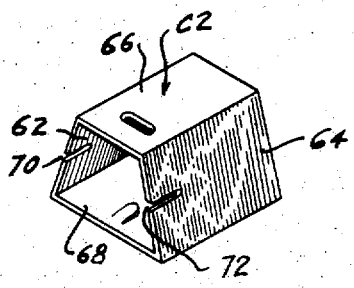
Fig. 15 is a perspective view of a casing for a panel carrying a plurality of terminals.
Figure 17:
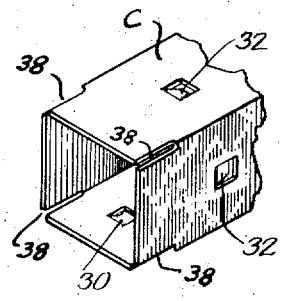
Fig. 17 is a fragmentary perspective view of the casing illustrated in Figs. 6, 7, and 8.
Figure 16:
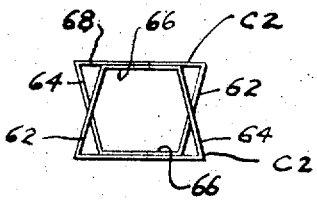
Fig. 16 is a fragmentary view showing two casing parts such as shown in Fig. 15 interfitting together.

In Figs. 15 and 16, I have shown a casing, generally designated as C2, which is adapted to hold the strip A2 but wherein the sides 62 and 64 are slightly inclined relative to each other instead of being at right angles to the parallel sides 66, 68. The sides 62, 64 are formed with slots 70 and 72, respectively, the purpose of these slots 70 and 72 being to enable the inclined walls of the casings to interlock so that the contact members on the strip A2 will properly interfit mechanically and electrically and they can be fitted together only in one position.

Although my invention has been described in considerable detail, such description is intended as being illustrative rather than limiting, since the invention may be variously embodied, and the scope of the invention is to be determined as claimed.

I claim as my invention:

[1. An electrical coupling device comprising a pair of complementary, interchangeable casings, a support of insulating material within each of said casings, a furcated contact member carried by each of said supports, one of said contact members being disposed in a plane at a right angle to that of the other of said contact members, the furcated portions of said contact members being arranged in opposed relation and being adapted to interfit in firm engagement with one another to provide electrical contact therebetween, and complementary, cooperable means on said casings for releasably locking said casings to each other whereby to maintain said contact members in contacting relation.]

2. In an electrical contact device, a support of insulating material, and a contact member carried thereby, said member comprising a strip of electro-conductive material bifurcated at one end for the reception thereon of a similarly constructed strip and slitted from its other end a distance toward said bifurcated end to provide two separable portions, said support having a pair of spaced openings therein through each of which a separate one of said separable portions extends, said separable portions being formed with reverse bends one on each side of said support, said bends being in engagement with the respective sides of said support whereby to clamp said strip thereto, said bifurcated end being disposed on one side of said support and said other end being disposed on the other side of said support.

3. In an electrical contact device, a support of insulating material, and a contact member carried thereby, said member comprising a strip of electro-conductive material bifurcated at one end for the reception thereon of a similarly constructed strip and slitted from its other end a distance toward said bifurcated end to provide two separable portions, said support having a pair of spaced openings therein through each of which a separate one of said separable portions extends, said separable portions being formed with reverse bends one on each side of said support, said bends being in engagement with the respective sides of said support whereby to clamp said strip thereto, said bifurcated end being disposed on one side of said support and said other end being disposed on the other side of said support, and said ends being both disposed in a common plane.

*4. A quick detachable electrical connector comprising a pair of connectable parts each including a bifurcated contact member having spacer legs at one end, said legs tapering inwardly from the body portions thereof in a direction toward the facing surfaces of said legs whereby said facing surfaces are of smaller transverse dimension than said body portions, the tapers on said legs providing contacting surfaces for said contact members, said contact members being disposed in planes normal to each other and in opposed relation whereby said contact members may be brought into mating relation with each other and with their said contacting surfaces in engagement with each other, and the legs of each of said contact members being spaced from one another a distance such that said legs are engaged under tension.*

BENJAMIN FOX.

REFERENCES CITED

The following references are of record in the file of this patent or the original patent:

UNITED STATES PATENTS

| Number | Name | Date |
|---|---|---|
| 589,708 | Flint | Sept. 7, 1897 |
| 2,125,816 | Reynolds | Aug. 2, 1938 |
| 2,386,177 | Andersen | Oct. 9, 1945 |
| 2,389,115 | Anderson | Nov. 20, 1945 |

FOREIGN PATENTS

| Number | Country | Date |
|---|---|---|
| 20,685 | England | of 1898 |
| 477,255 | England | Dec. 24, 1937 |
| 537,029 | France | June 18, 1921 |

Certificate of Correction

Reissue No. 23,547 September 9, 1952

BENJAMIN FOX

It is hereby certified that error appears in the printed specification of the above numbered patent requiring correction as follows:

Column 6, line 25, for "*spacer*" read *spaced*;

and that the said Letters Patent should be read as corrected above, so that the same may conform to the record of the case in the Patent Office.

Signed and sealed this 24th day of March, A. D. 1953.

[SEAL]

THOMAS F. MURPHY,
*Assistant Commissioner of Patents.*